Figure 4:
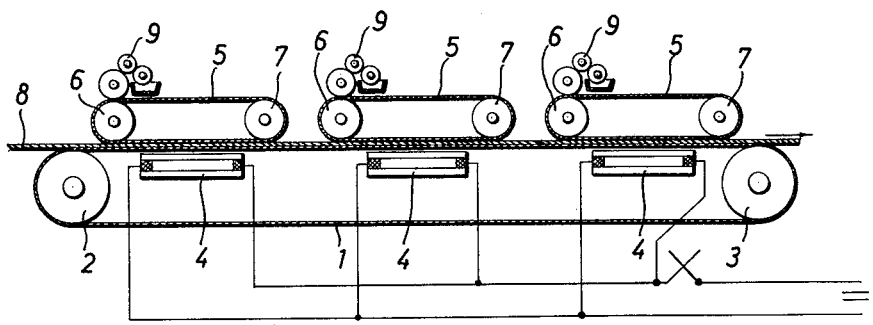

Dec. 11, 1962  R. KRAFT  3,067,718
APPARATUS FOR TREATING SHEET MATERIALS
Filed Nov. 3, 1959  2 Sheets-Sheet 1
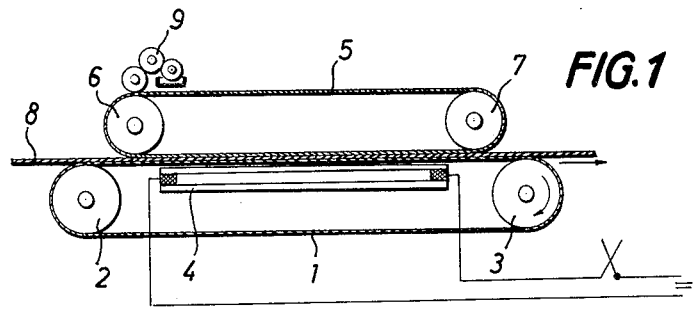
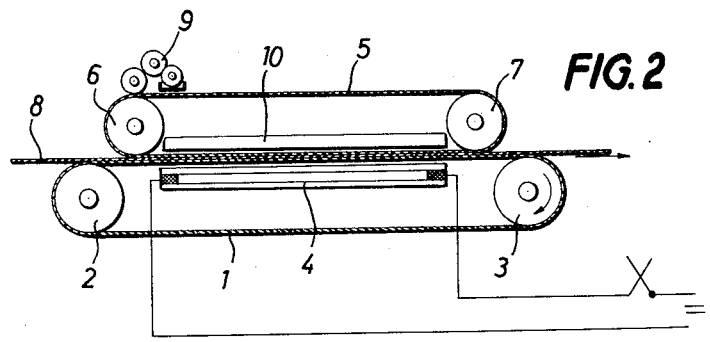
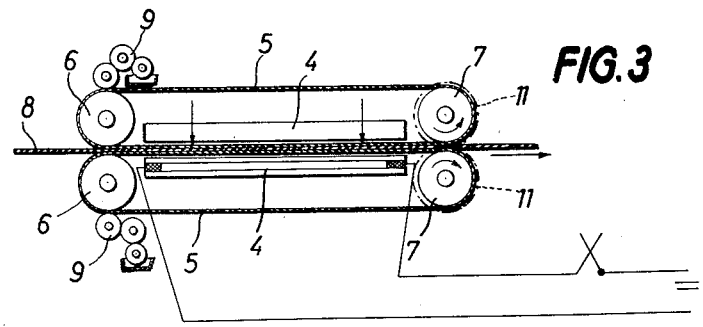
INVENTOR.
RUPERT KRAFT
BY Toulmin & Toulmin
ATTORNEYS Dec. 11, 1962 R. KRAFT 3,067,718
APPARATUS FOR TREATING SHEET MATERIALS
Filed Nov. 3, 1959 2 Sheets-Sheet 2

INVENTOR.
RUPERT KRAFT
BY Toulmin & Toulmin

ATTORNEYS

United States Patent Office 3,067,718
Patented Dec. 11, 1962

3,067,718
APPARATUS FOR TREATING SHEET MATERIALS
Rupert Kraft, Kufstein, Austria, assignor to Maschinenfabrik Johannes Zimmer, Klagenfurt, Austria
Filed Nov. 3, 1959, Ser. No. 850,626
Claims priority, application Austria Nov. 5, 1958
8 Claims. (Cl. 118—58)

Various apparatus are known for treating sheet materials, e.g., for printing, coating, calendering or laminating two or several materials. The most widely used apparatus consists essentially of rollers, which during operation exert a certain pressure on the sheet material to modify the surface thereof. Depending on the diameter and the material of the roller used and on the backing, e.g., a table or a backing roller, and the pressure applied, the contact is more or less linear or on a surface.

Apparatus comprising rollers are only suitable for continuous operation and apparatus in which the pressure is simultaneously and uniformly exerted throughout the surface of a sheet material can be used only for intermittent operation or for treating sheet material in individual sheets. In continuous operations and for achieving certain effects the time for which the sheet material remains under the action of pressure is of special importance. Whereas it is of advantage if the pressure is entirely uniformly exerted throughout an area which is as large as possible, this cannot be achieved even with soft rollers, e.g., for printing paper webs, textiles, plastic webs, and the like, and for vulcanizing rubber cloths having inserts or for laminating two or more webs of any desired material.

It is an object of the invention to provide an apparatus whereby sheet material can be treated on surfaces of any desired area by causing a uniform and simultaneous pressure to act throughout the surface. This is achieved in that the material is guided between an endless conveyor belt which is guided on a magnetic or electromagnetic faceplate, and a preferably impermeable, endless working belt which consists of a material responsive to magnetic forces and which is stretched on rollers and to which the material to be treated is supplied from the outside.

It is another object of the invention to provide an apparatus of the kind described hereinbefore in which the material to be treated can be heat-treated at the same time.

A further object of the invention resides in the provision of an apparatus of the kind described hereinbefore in which sheet material can be subjected to several successive treatments.

For a simultaneous treatment of both sides of the material the endless conveyor belt may also consist of a working belt made from material responsive to magnetic forces and stretched around rollers; in this case each of the two working belts will be guided on a magnetic or electromagnetic faceplate, the mutually opposite surfaces of the two faceplates having different polarities and at least one of the two faceplates being movable in the direction to the other.

It is desirable to provide for a regulation of the magnetic forces of the faceplate or faceplates. In the case of electromagnetic faceplates this can be effected most simply by a variation of the exciter current.

The invention relates also to various forms of construction of the apparatus according to the invention.

Figures 5, 6:
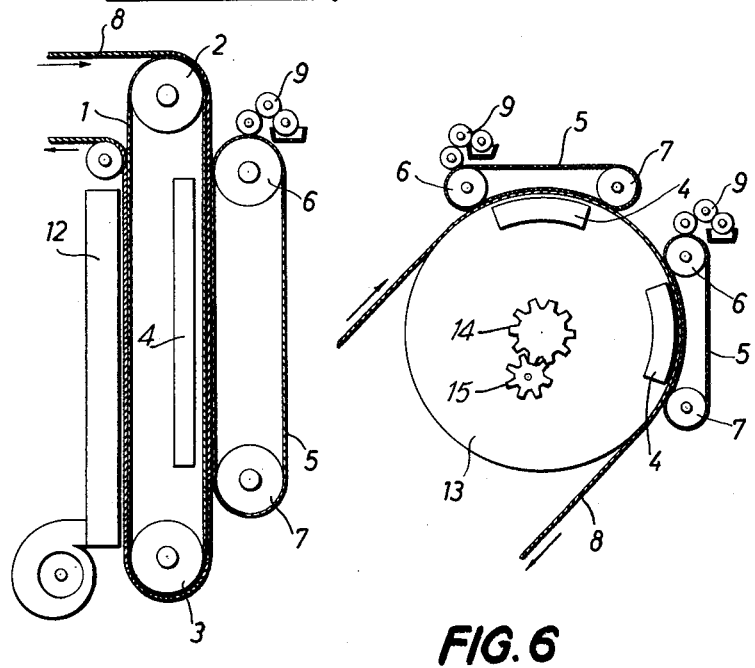

Various embodiments of the apparatus according to the invention are diagrammatically shown in the accompanying drawings, in which:

FIG. 1 shows an apparatus for printing sheet material on one side,

FIG. 2 shows a modification of the embodiment of FIG. 1 with means for a simultaneous heat treatment, FIG. 3 shows an apparatus for printing the sheet material on both sides, FIG. 4 shows an apparatus for three-color printing, FIG. 5 shows a machine for three-color printing with vertically arranged faceplate tables, and FIG. 6 shows an apparatus for two-color printing with faceplates arranged in a circle.

In the embodiment according to FIG. 1 an endless conveyor belt 1, e.g., of rubber having an appropriate insert, extends around the tension roller 2 and the driven roller 3. The upper strand of the conveyor belt 1 slides on a magnetic or electromagnetic faceplate 4 which extends throughout the width of the conveyor belt and is of appropriate length. This faceplate 4 has a magnetic field of controllable length. The magnetic field may either be uniformly controlled simultaneously throughout the length or differently in various sections.

Above the conveyor belt with its rollers and faceplate an endless working belt 5 is provided which is responsive to magnetic forces and extends around two rollers 6 and 7 which do not respond to magnetic forces. The width of this working belt 5 conforms to the material moved between the working belt 5 and the conveyor belt 1. The working belt 5 may consist of a smooth, endless belt of magnetic rubber or an endless printing block of magnetic rubber. Depending on the intended use a device 9 is disposed above the upper strand of the working belt 5, by which device the material required for treating the sheet material 8 such as ink, adhesive or coating material can be applied.

During operation the material required for the treatment is entrained by the working belt and is applied to the material 8 throughout the length and width of the faceplate 4 under the action of pressure. The working belt 5 is driven entirely without slippage by the increased pressure caused by the magnetic field of the faceplate 4, which field acts through the conveyor belt 1 and the web of material 8 on the working belt 5 so that the apparatus is suitable for transmitting any prints in relief or by offset printing. In the latter case the transfer device 9 must be be provided with a corresponding attachment. The residence time of the sheet material 8 may be influenced by the length of the faceplate 4 and the selection of the speed of the conveyor belt 1. In this way the desired effected can be altered.

The construction of the apparatus according to FIG. 2 differs from that according to FIG. 1 only in that it permits of a simultaneous heat treatment of the material 8. For this purpose a hotplate 10 which is not responsive to magnetic forces is disposed above the faceplate 4. If only a heat treatment is desired the transfer device 9 can be eliminated. Instead of a heater which is not responsive to magnetic forces, however, a heater could be used which has on its underside a polarity opposed to the polarity of the upper side of the faceplate 4.

FIG. 3 shows an apparatus for treating the material 8 on both sides at the same time. In this apparatus the upper and lower parts of this apparatus are constructed like the upper part of the apparatus of FIG. 1. In the lower part the conveyor belt 1 is replaced by a working belt 5 which is responsive to magnetic forces. Within each of the two working belts a faceplate 4 is disposed. The polarities of the surfaces of the two faceplates facing each other are different so that these two faceplates attract each other. A transfer device 9 may be associated with each of the two working belts 5. The two faceplates may be heated if a simultaneous heat treatment is desired. One of the two faceplates is stationary and the other one is movable in the direction of the arrows. The two driven rollers 7 are connected to each other by means of spur gears 11 to be driven in synchronism with each other.

FIG. 4 shows the construction of an apparatus for three-color printing, in which each of the three inking mechanisms comprises an endless working belt 5 with the appertaining rollers 6 and 7 and a transfer device 9. Each working belt has a faceplate 4 associated therewith.

The embodiment according to FIG. 5 differs from that of FIG. 1 only in that it is turned upwardly through 90°. As a result the faceplate 4 is at right angles and also the rollers 2 and 3 and 6 and 7 are vertically superimposed. A drier 12 is associated with that strand of the conveyor belt which faces the faceplate.

FIG. 6 shows an apparatus for two-color printing. In this apparatus the faceplate tables 4 are arranged in the form or segments of arcs of a circle within a thin-walled hollow cylinder 13 which consists of nonmagnetic material and has a rotary drive 14, 15 transmitted to it.

Various modifications are possible without departing from the scope of the invention. The electromagnets might be replaced by permanent magnets which can be rendered inoperative or varied in their field intensity. Instead of a faceplate of flat shape or of the shape of a segment of a circle a roller might be used around which the conveyor belt, the material to be treated and the working belt extend.

What is claimed is:

1. Apparatus for treating sheet material, which comprises a magnetic faceplate, an endless working belt of a material responsive to magnetic forces, at least one set of two rollers, said working belt being stretched around said set of rollers and extending in the magnetic range of said faceplate, means for transferring treating material to said working belt from the outside, and a conveyor adapted to be driven, disposed between said working belt and faceplate and operable to move material to be treated into contact with that side of the working belt which faces said faceplate.

2. Apparatus as set forth in claim 1, in which said faceplate is permanently magnetic.

3. Apparatus as set forth in claim 1, in which said faceplate is electromagnetic.

4. Apparatus as set forth in claim 1, which comprises means for controlling the magnetic forces exerted by said faceplate.

5. Apparatus as set forth in claim 1, which comprises a hotplate of a material which is not responsive to magnetic forces, said hotplate being disposed adjacent to said faceplate on that side of said working belt which faces away from said faceplate.

6. Apparatus as set forth in claim 1, which comprises at least one additional faceplate, at least one additional endless working belt of a material responsive to magnetic forces, at least one additional set of two rollers, each of said additional working belts being stretched around one of said additional sets of rollers and extending in the magnetic range of said additional faceplate, and means for transferring treating material to each of said additional belts from the outside, said working belts being arranged one behind the other in the direction of movement of said conveyor, and said conveyor being operable to move material to be treated successively into contact with that side of each of said working belts which faces said faceplate in the magnetic range of which it is arranged.

7. Apparatus as set forth in claim 1, in which said faceplate is vertically arranged.

8. Apparatus as set forth in claim 1, in which said conveyor comprises a thin-walled hollow cylinder of nonmagnetic material and arranged to have a rotary drive imparted thereto and said faceplate is of arcuate shape and disposed inside said cylinder.

References Cited in the file of this patent

UNITED STATES PATENTS

| | | |
|---|---|---|
| 1,561,063 | Dunlap | Nov. 10, 1925 |
| 2,857,879 | Johnson | Oct. 28, 1958 |